United States Patent [19]

Blum et al.

[11] Patent Number: 5,032,348

[45] Date of Patent: Jul. 16, 1991

[54] STOWAGE RACK FOR NUCLEAR FUEL ELEMENTS

[75] Inventors: Paul Blum, Saint Nom-la-Bretèche; Patrick Meyer, Vanves, both of France

[73] Assignee: Transnucleaire, Paris, France

[21] Appl. No.: 311,738

[22] Filed: Feb. 17, 1989

[30] Foreign Application Priority Data

Feb. 19, 1988 [FR] France .................................. 88 02506

[51] Int. Cl.⁵ ............................................. G21C 19/40
[52] U.S. Cl. ....................................................... 376/272
[58] Field of Search ........................................... 376/272

[56] References Cited

U.S. PATENT DOCUMENTS

| | | | |
|---|---|---|---|
| 4,024,406 | 5/1977 | Bevilacqua | 376/272 |
| 4,034,227 | 7/1977 | Soot | 376/272 |
| 4,042,828 | 8/1977 | Rubinstein et al. | 376/272 |
| 4,124,445 | 11/1978 | Mollon | 376/272 |
| 4,319,960 | 3/1982 | Larson et al. | 376/272 |
| 4,525,324 | 6/1985 | Spilker et al. | 376/272 |
| 4,567,015 | 1/1986 | Bosshard | 376/272 |
| 4,710,342 | 12/1987 | Helary et al. | 376/272 |

FOREIGN PATENT DOCUMENTS

| | | | |
|---|---|---|---|
| 2835392 | 2/1980 | Fed. Rep. of Germany | 376/272 |
| 2930237 | 2/1981 | Fed. Rep. of Germany | 376/272 |
| 61-137097 | 6/1986 | Japan | 376/272 |
| 61-153595 | 7/1986 | Japan | 376/272 |

Primary Examiner—Daniel D. Wasil
Attorney, Agent, or Firm—Dennison, Meserole, Pollack & Scheiner

[57] ABSTRACT

A stowage rack is disclosed for dry transport of nuclear fuel elements in a plurality of elongated, parallel, adjacent prismatic cells. The rack is formed from first and second sets of materials, the first set of materials fulfilling the function of mechanical strength and thermal conductivity, and the second set of materials fulfilling the function of neutron absorption. The stack may be formed entirely of materials fulfilling the function of mechanical strength and thermal conductivity, with the neutron absorption materials being provided within the walls of the cells. Alternatively, materials providing mechanical strength and thermal conductivity may be stacked alternately with materials providing neutron absorption.

10 Claims, 7 Drawing Sheets

STOWAGE RACK FOR NUCLEAR FUEL ELEMENTS

TECHNICAL FIELD

The invention concerns a stowage rack for nuclear fuel elements comprising a plurality of cells, a fuel element to be stowed being inserted in each cell. These stowage racks are used to store the fuel element in a pool or under dry conditions and/or to transport them in a shielded container, which is dried after loading.

STATE OF THE ART

Stowage racks for nuclear fuel elements are normally made up of adjacent prismatic cells, usually of square cross-section and of elongated shape with a long axis. The cross-sectional shape of the cells is generally identical with that of the fuel elements to be stowed, and the height of the cells is at least equal to that of the elements.

The racks according to the invention are suitable for stowing non-irradiated nuclear fuel elements requiring sub-critical conditions, and the fuel may be based on uranium oxide exclusively or on any combustible oxide mixtures. However, they are particularly adapted to stowing and transporting irradiated fuel elements under dry conditions in a sheathed container.

In this application any rack—also known as a stowage rack—must simultaneously fulfil several functions:

transfer of the heat generated by the irradiated fuel elements stowed in it, to the wall of the sheathed container in order to dissipate it. The better the thermal conductivity of the rack material and the better the contact between the rack and the wall of the container, the better this function is fulfilled.

neutron absorption to guarantee that the rack filled with fuel is in a sub-critical state, either under dry conditions or when immersed in water during storage in a pool or during operations in which sheathed enclosures are loaded and unloaded; these may also be carried out in a pool. This function is fulfilled by using materials containing neutron absorbing elements such as B, Gd, Hf, Dc, In, Li and the like, said materials being used directly in the design of the rack, or by using neutron absorbers inserted in the fuel elements and by good neutron degradation obtained through forming spaces near said neutron absorbing and neutrophage materials.

high enough mechanical strength to support the load of combustible elements during transportation and to maintain the geometry of the rack even in the event of impact, thereby maintaining sub-critical conditions and avoiding the risks of the fuel elements and rods deteriorating as a result of heating and/or crushing.

These functions are normally fulfilled by making the walls of the cells from materials arranged in a plurality of superposed layers. For example, material of the sandwich type may be used, comprising at least two layers: a layer of an alloy fulfilling the mechanical strength and heat transfer functions, with preferably homologated properties, and a layer of an alloy or composite material containing a neutron absorber; here the mechanical and thermal properties are not generally homologated. The layers are combined by an known means, e.g. by rolling them together or by electroplating, mechanical assembly, welding etc.

The material containing the neutron absorber may, for example, be stainless steel containing approximately 1% of boron or an aluminium alloy containing approximately 3% or boron. Alternatively it may be a fritted boron carbide/aluminium product which may or may not be coated with aluminium, or cadmium, deposited electrolytically on a metal carrier. When an aluminium alloy is used, it is generally supplied in the form of strips which are then attached to the other layers as indicated above. The strips may be obtained by rolling or extrusion from bars of adequate size. The bars must be very homogeneous and very sound (no blistering, cracks etc.), and the larger the bars are the more precautions have to be taken. In spite of the precautions taken, the guaranteed minimum boron content of the flat product is often one point below that of the starting product.

The common, cheap form of these materials is the wire supplied in coil form. These are obtained by continuous casting e.g. of a ring a few centimeters in diameter, which is then rolled and/or drawn. Boron aluminium wire with a diameter of approximately 10 mm is manufactured in this way, and its guaranteed boron content is generally 2.5 or 3.5%.

Other cell wall designs have been described, also fulfilling the neutron absorbing function. For example, U.S. Pat. No. 4,034,227 (Soot) describes wall members which may be assembled with special tenons to form a rack. The members are pieces which are specially extruded in the cell length direction. They have a complicated cross-sectional shape with a series of projecting notches zig-zagging from one side of a flat wall to the other, parallel with the extruding direction. The notches are open along a generatrix and designed to receive neutrophage rods.

Although a design of this type, using neutron absorbing rods, avoids the tricky processing of the kind of material described above, it nevertheless involves extruding pieces with a large cross-section and a complicated profile. This greatly restricts the number of potential suppliers, given the size of the presses which would have to be used and the resultant extrusion problems. An assembly of this type also has the drawback of having a multiplicity of mortise and tenon type joints (36, 38, 39 . . . ) in the corners of the cells; these make it difficult to obtain good mechanical strength and adequate thermal conductivity.

OBJECT OF THE INVENTION

The object of the invention is a stowage rack for irradiated or non-irradiated fuel elements, which may be used for dry storage or for transporting the elements dry in a sheathed container. The rack must fulfil mechanical strength, heat transfer and neutron absorbing functions.

The invention aims to simplify the processing of the materials used in making the racks and consequently to reduce their cost; at the same time the mechanical, thermal and neutron performance of the racks must be easily homologated. Its purpose is therefore to use materials and semi-finished products which are readily available on the market and have known properties. It must be possible to use them directly as they are, without any intermediate metallurgical transformation and without requiring more than simple assembly means. Since these materials and semi-finished products are preferably standardized, they are generally more reliable and less expensive than extruded, rolled or composite items which have been specially researched and developed.

Another object of the invention is to have a rack in which at least the mechanical strength and heat transfer functions are separated from the neutron absorbing function, with a further possibility of separating all three functions, thus making it easier to calculate and homologate the performance of the rack.

A further object of the invention is to have a rack in which the neutron barrier may optionally be continuous or, preferably, discontinuous.

DESCRIPTION OF INVENTION

Figure 1:
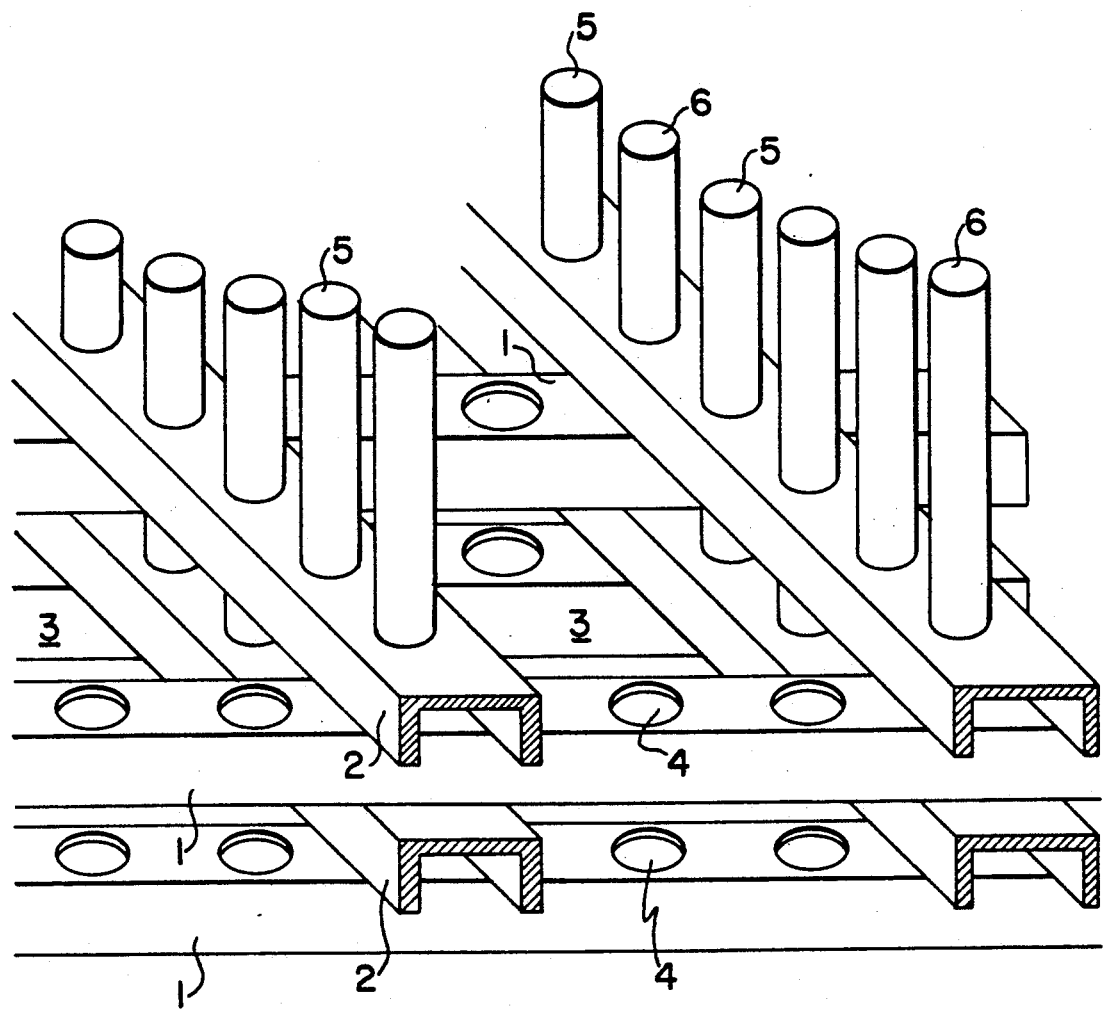
FIG. 1 shows a stack formed to create a stowage rack with cells of rectangular or square cross-section.

The invention is a stowage rack for nuclear fuel elements, for storage or preferably dry transport, comprising a plurality of adjacent prismatic cells which are parallel and very long, said cells being designed to receive said fuel elements and forming a unit which must fulfil mechanical strength, thermal conductivity and neutron absorption functions, characterised in that, for the purpose of construction the rack from known, reliable materials which will fulfil the mechanical strength and thermal conductivity functions, and providing at least the neutron absorbing function separately, the walls of the cells are made up of a neat intersecting stack of elongated structural members of the profile type, of constant cross-section and made of common material, disposed in successive layers perpendicular to the axis of the cells, and that said walls control criticality, either due to their thickness and due to neutrophage rods arranged inside said walls parallel or perpendicular to the axis of the cells, or through having the structural members of common material with mechanical strength and/or thermal conductivity functions alternating in the stack with structural members of neutrophage material fulfilling the neutron absorbing function; the stack being such that the rack fulfils all the required functions.

Thus the rack according to the invention is used for packing nuclear fuel elements under conditions requiring the presence of a neutron absorber, allowing for their geometry and their composition.

A stowage rack of this type may be used either for storing fuel elements in a pool or preferably dry, or more preferably for transporting them under dry conditions. In this rack it is placed in a sheathed container before or after the fuel elements have been loaded. If the elements transported have been irradiated, the container both provides biological and mechanical protection and dissipates heat. The stowage rack acts as a neutron absorber and is the sole means of transferring the heat given off by the irradiated fuel elements to the sheathed container. The rack also has an essential mechanical strength function, particularly in avoiding possible crushing of the elements in the event of an accident, and in supporting the load of packed elements during horizontal transportation.

Such a rack may equally be self supporting. All that is required is to reinforce it by any appropriate means and to fit it with handling devices, a base and possibly a cover.

The rack according to the invention is made up of a plurality of adjacent prismatic cells, They may have any cross-section and are generally all identical. They have common walls, which are thick enough (in the transverse direction to the cell axis) to carry out the mechanical strength and thermal conductivity functions and, where appropriate, to contain the neutrophage rods, as will be explained later.

The structural members chosen to form the neat stack are elongated with a cross-section of substantially constant profile; they are preferably sections of the normal type, with a preferably angular cross-section of simple shapes such as L, U, T, I, H, crosses, tubes or solid bars of square or rectangular section, flat strips and the like. Pairs of elongated thin flat strips may equally be used as structural members. Their long surfaces are arranged parallel with each other and parallel with the axis of the cells, and the space thus defined between the strips must be sufficient to insert the neutrophage rods, parallel or perpendicular to the cell axis. The structural members may equally be elongated extruded flat bars of rectangular section, with aligned tubular receptacles formed inside them to receive the neutrophage rods.

All these different types of structural elements may be used either alone or in combination.

They are generally straight but may also be evenly bent, with the edges of the bent portions arranged parallel with each other and perpendicular to the plane containing the resultant broken line.

The stack is formed parallel with the axis of the cells to be obtained, with the length of the structural members directly perpendicular to the cell axis. The structural members are stacked in successive layers or rows, so that they are in a well-defined general direction in each layer or row, the directions cutting across each other from one layer to another. The number of directions is usually the same as the number of walls required, but this is not essential: two or three directions may, for example, be used for cells or hexagonal section.

Structural members extending in the same direction and located in different layers are stacked, aligned, parallel with the axis of the cells, to form the cell walls. They must be long enough for one and the same member to serve a plurality of cells.

To obtain a vertical, square mesh cellular rack, for example, a first layer is formed by arranging the structural members in a horizontal plane, parallel with a direction A and spaced by a distance corresponding to the cell mesh; then by forming a second horizontal layer on the first through arranging the structural members in the same way but in a direction B perpendicular to the direction A. Thus a square mesh cellular structure can be obtained by alternating the layers in directions A and B and ensuring that stacked members extending in the same direction are vertically aligned.

Similarly cells of hexagonal mesh can be obtained by crossing over the layers of structural members in two or preferably three directions, forming angles of 60° between them. The members must first have been bent evenly at 120°, to form a broken line in which each segment has the dimension of one side of the cell. This kind of stack, illustrated in FIG. 5, will be described in greater detail later.

The structural members in the different layers or rows are rigidly connected by any known joining means such as pins, bolts, welds, flat bar, staples, angle irons, rivets, tie rods, punched plates etc., so as to maintain the cohesion and rigidity of the stack forming the cellular structure.

As a complementary measure the compactness of the stack may be increased, while still maintaining its cohesion and rigidity, if the structural members are provided with positioning notches or incisions cooperating with one another, as in certain bottle cases or in the construction of mountain huts where the walls are assembled by this nesting process. If this is done the walls need not contain any cut outs. Neutrophage rods are preferably placed within the actual walls of the cells, extending in the desired direction, i.e. parallel or perpendicular to the cell axis. If necessary appropriate holes first have to be made in the structural members. Thus if a stack of profiled members other than flat strips is used, e.g. 'H' shaped or 'U' shaped members, holes are drilled in the sole plates or cores of the sections which are perpendicular to the cells' axis, and the neutrophage rods will then be parallel with that axis.

Figure 4:
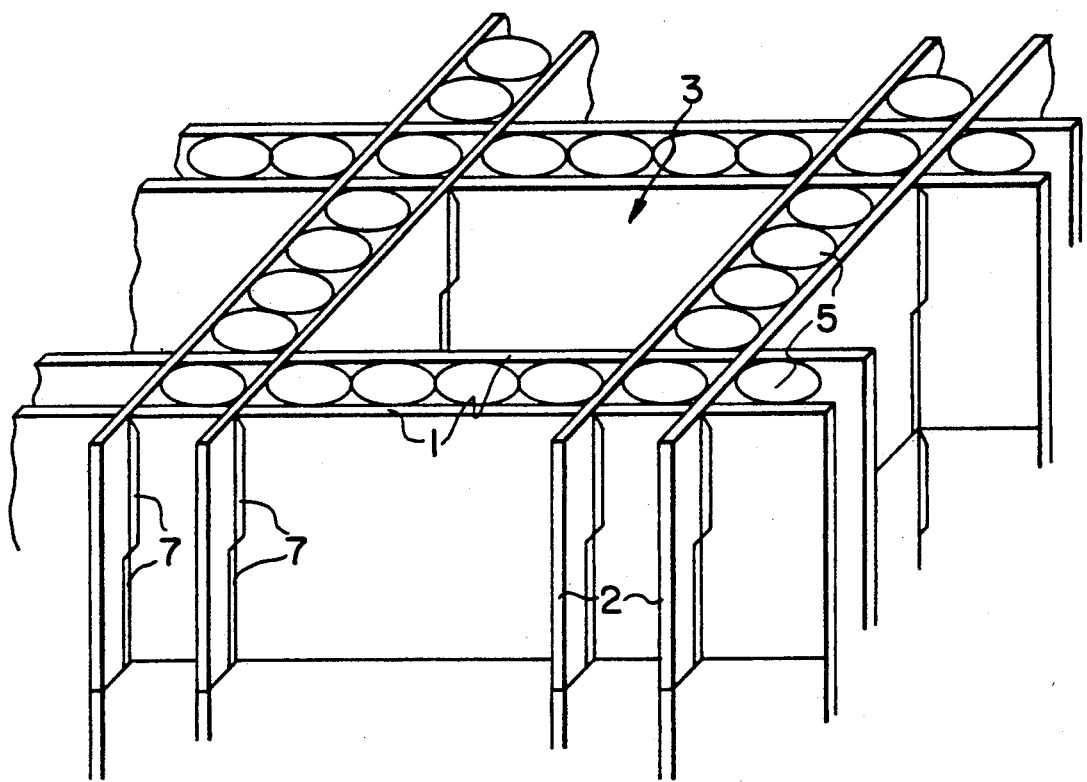
FIG. 4 is an assembly where the structural members are pairs made up of two parallel flat bars.

Similarly, if the structural members used are extruded flat bars, which are crossed over and nested by means of incisions, and which are of rectangular cross-section and adequate thickness, tubular receptacles can be formed in the extruding direction to receive the neutrophage rods, e.g. by means of a bridge type die. The structural members may also be reinforced locally, e.g. by extra thick portions judiciously arranged, particularly near the zones which have been drilled to receive the neutrophage rods. If on the other hand the cell walls are formed by a stack of structural members comprising pairs of thin flat strips, with their surfaces parallel to each other and to the cell axis, then the neutrophage rods will be inserted directly into the space defined by the parallel surfaces of the bars facing one another, as illustrated in FIG. 4.

The neutrophage rods may be arranged perpendicular to the axis of the cells; in this case they will improve the other functions (mechanical strength and heat transfer).

The structural members forming the cell walls must a least fulfil the mechanical strength and heat transfer functions. For this purpose they can be made from a choice of materials fulfilling both functions, for example steels (normal, stainless or special), aluminium, copper or magnesium or alloys thereof, and generally any metals or materials which will form sections with the required mechanical and thermal properties.

Materials which only fulfil one function may equally be used; for example, layers of structural members made of materials with high mechanical strength such as steel may be alternated with others with good heat conductivity such as copper.

In some special cases structural members of neutrophage material may be inserted in the stack forming the cellular rack. Thus the members of neutrophage material may be stacked alternately with those providing the mechanical strength and heat transfer. This alteration may take place either from one layer to another or within the same layer or there may be a combination of both.

It is compulsory for the neutrophage material used in the invention to contain at least one neutrophage element such as B, Gd, Hf, Cd, In, Li, etc. The material is made up of that element itself or one of its compounds, used as such or combined with a different material to give a composite. These other materials may be:
- metals or metal alloys such as Al, Cu or their alloys, charged with boron or another neutrophage element,
- the various types of fritted products (including fritting by extrusion through a die) containing boron or alternative material, e.g. $B_4C.Al$ or $B_4C.Cu$
- ceramics or glasses containing boron or alternative material.

These various composites are generally used in rod form with or without a sheath. The rods may equally be obtained by extruding billets of alloy or cermet obtained by known processes, including those of the spray deposition type.

However, it is an advantage to use any material which is readily available on the market, particularly wire made of boron-aluminium master alloy, containing 2.5 or 3.5% of boron. This is easily available as it is used in other applications which consume large quantities of this kind of product (e.g. aluminium refining).

The neutrophage rods cover at least part of the length or width of the cell walls, according to the direction in which they are installed, and may cover them all. The installation density of the bars is adapted to requirements. A neutrophage bar may be made up of a succession of component bars of reduced length.

To illustrate the invention FIGS. 1 to 7 give different examples of stacks using various types of simple sections.

FIG. 1 shows a stack formed to create a stowage rack with cells of rectangular or square cross-section; the stack is made up of structural members 1 and 2, which are 'U' shaped sections but could equally well be solid bars or hollow tubes of the same cross-section. The members 1 are all arranged in the same direction; so in one layer they are parallel and separated by a distance equal to the size of the cells 3. The members 2 in the adjacent layers are also parallel with one another but perpendicular to the members 1 and separated by a distance equal to the cell mesh in that direction. Holes 4 have been drilled in the horizontal sole plates, enabling neutrophage rods 5 to be inserted in the wall of the cell 3 parallel with its axis. In this case the cell walls contain cut-outs.

The parts are assembled by tie rods 6 located at the intersection of the structural members 1 and 2. They are made of a material with good mechanical strength, for example stainless steel; the assembly can be made rigid by end plates (not shown) containing cut outs as in the drawing of the cells.

Figure 2:
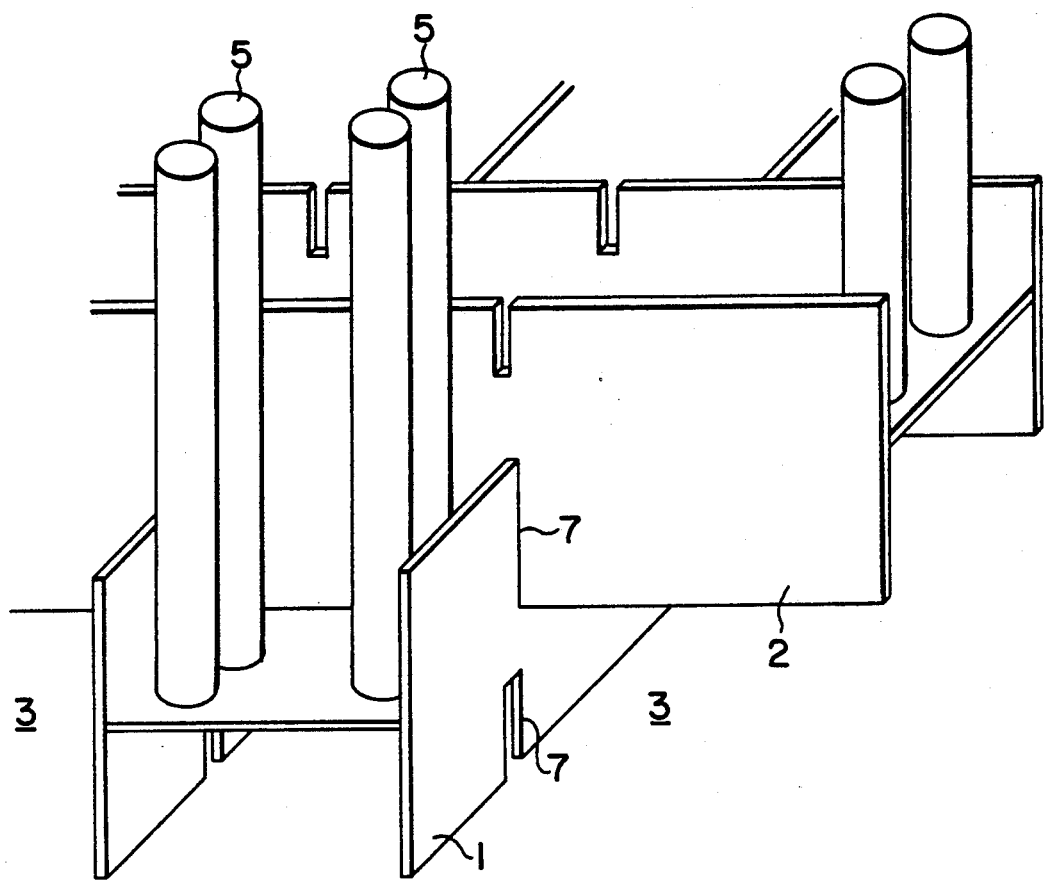
FIG. 2 shows the detail of an assembly of structural members which are "H" sections.

FIG. 2 shows the detail of an assembly of structural members 1 and 2, which are 'H' sections, using notches 7. With this type of assembly it is not necessary to have cut outs in the cell walls. The neutrophage wires 5 are arranged parallel with the cell axis in two rows within the walls of the said cell.

Figure 3:
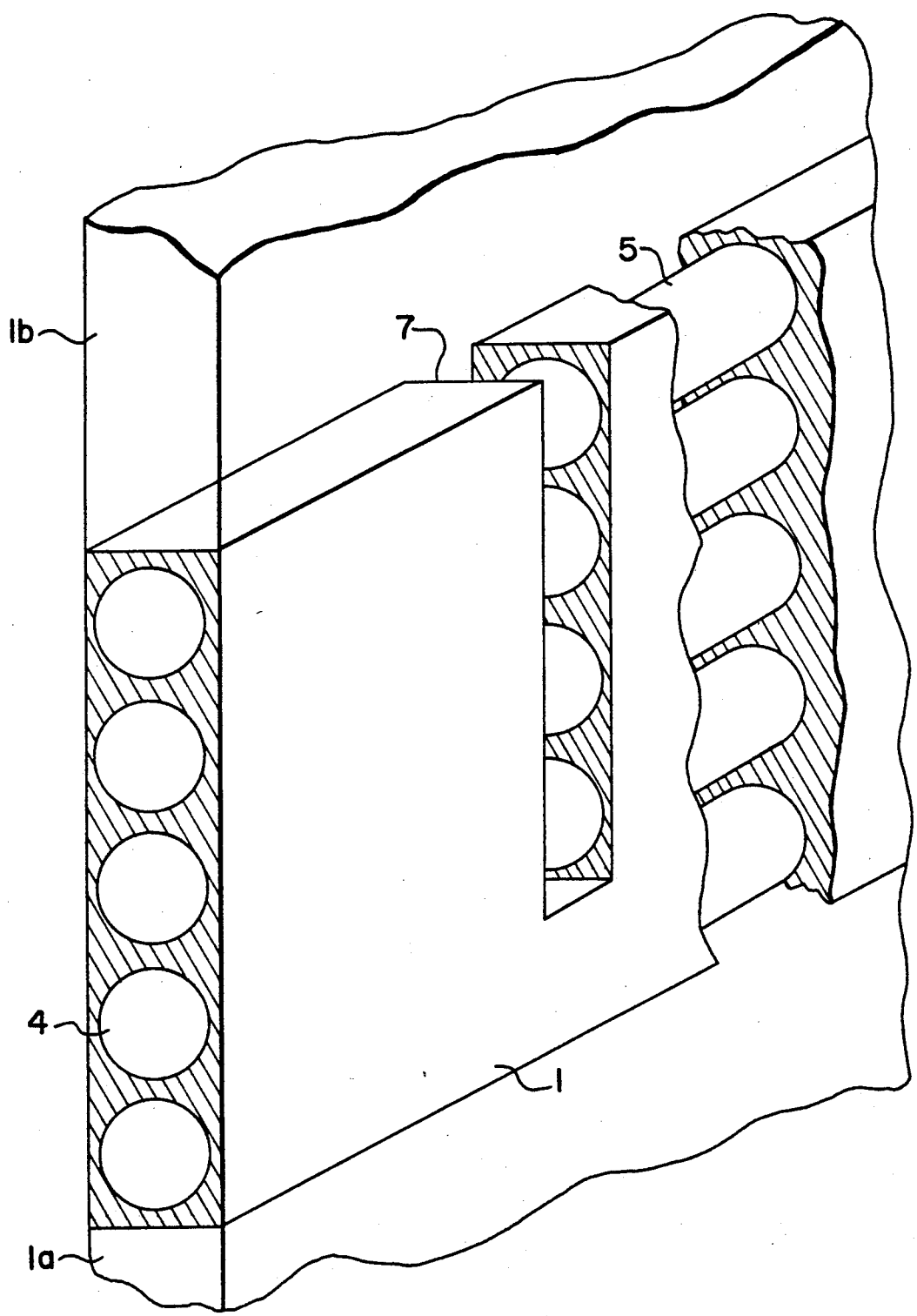
FIG. 3 shows a portion of a vertical stack of structural members in one direction.

FIG. 3 shows a portion of a vertical stack of structural members 1-1a-1b in one direction. The structural members are flat sections of rectangular cross-section with tubular receptacles 4 arranged inside them. The receptacles 4 are designed to receive the neutrophage rods 5, which in this case are perpendicular to the axis of the cells. Notches 7 enable the member 1 to be connected rigidly to the member perpendicular to it (not shown).

FIG. 4 is an assembly where the structural members are pairs 1 and 2 made up of two parallel flat bars. The pairs 1 and 2 are arranged in orthogonal directions and rigidly connected by means of notches 7. They form the walls of the cell 3. The neutrophage rods 5 are inserted in the actual walls parallel with the axis of the cell and with minimum diametric clearance, to avoid the risk of misalignment of the rods within the wall.

Figure 5:
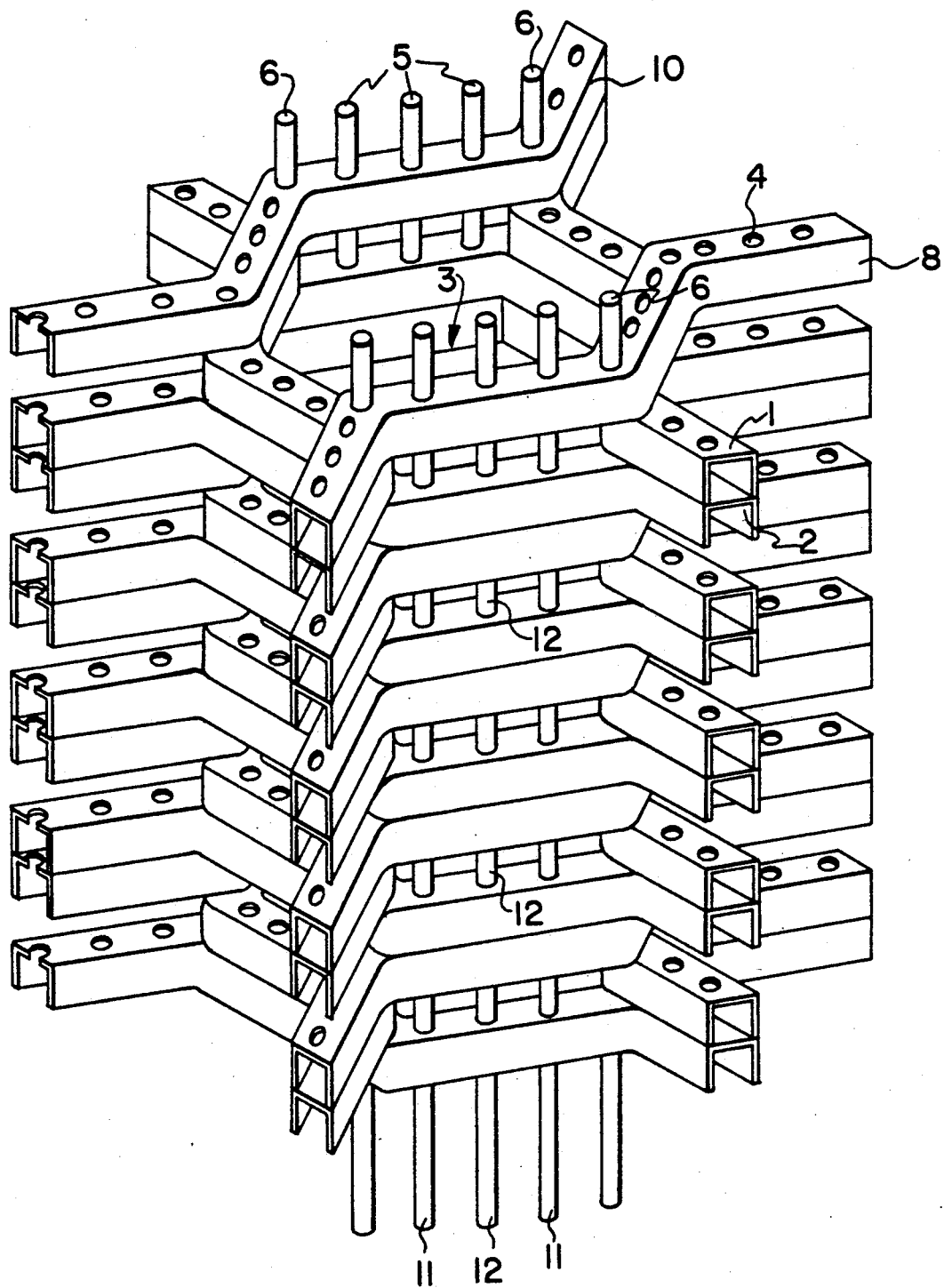
FIG. 5 represents a rack with hexagonal cells.

FIG. 5 represents a rack with hexagonal cells 3. It is formed by a stack of structural members 1-2-8. These are evenly bent 'U' sections (or any other shaped sections) in the form of a broken line extending in three directions 1-2-8. The directions are staggered at 60°, so that each cell wall is open over one-third of its height. The rack structure is completed as before by neutron absorber rods 5 and tie rods 6 inserted in the holes 4. The neutron absorber 5 may either be continuous, as are rods 11, or a series of abutting shorter rods 12.

Figure 6:
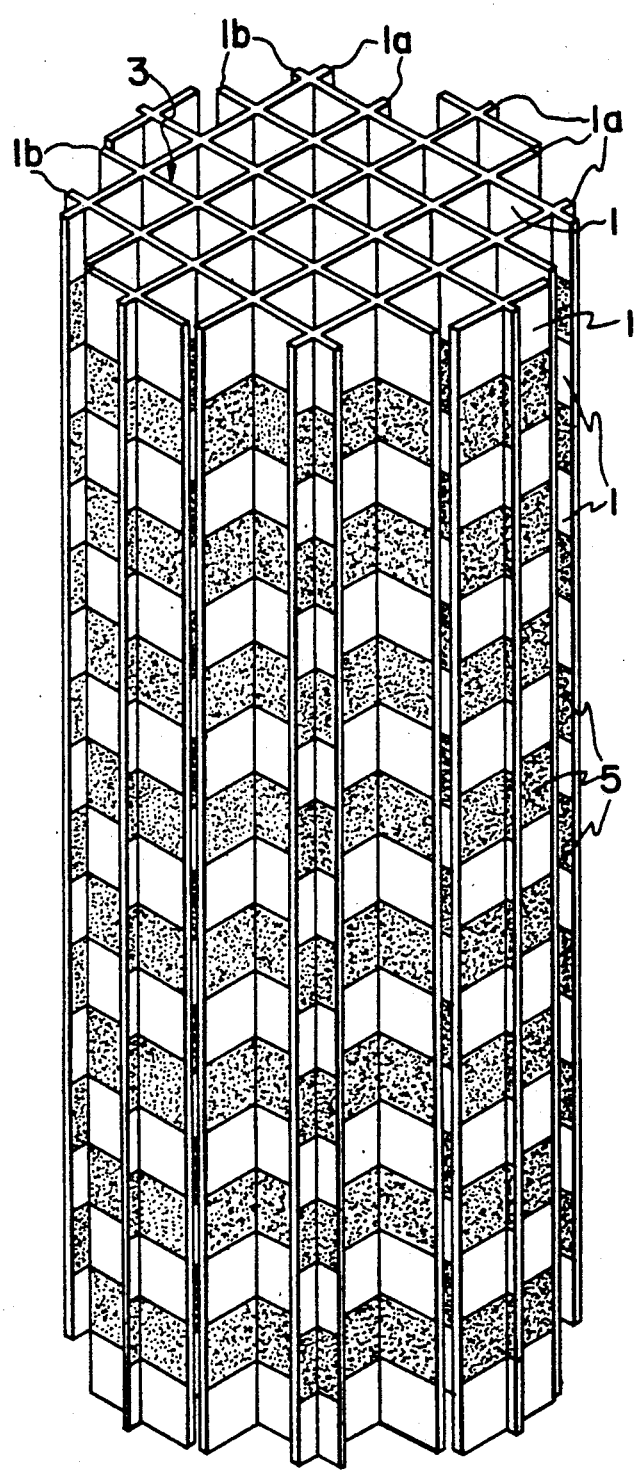
FIG. 6 shows a stowage rack comprising an intersecting stack of sections in the form of flat strips.
Figure 7:
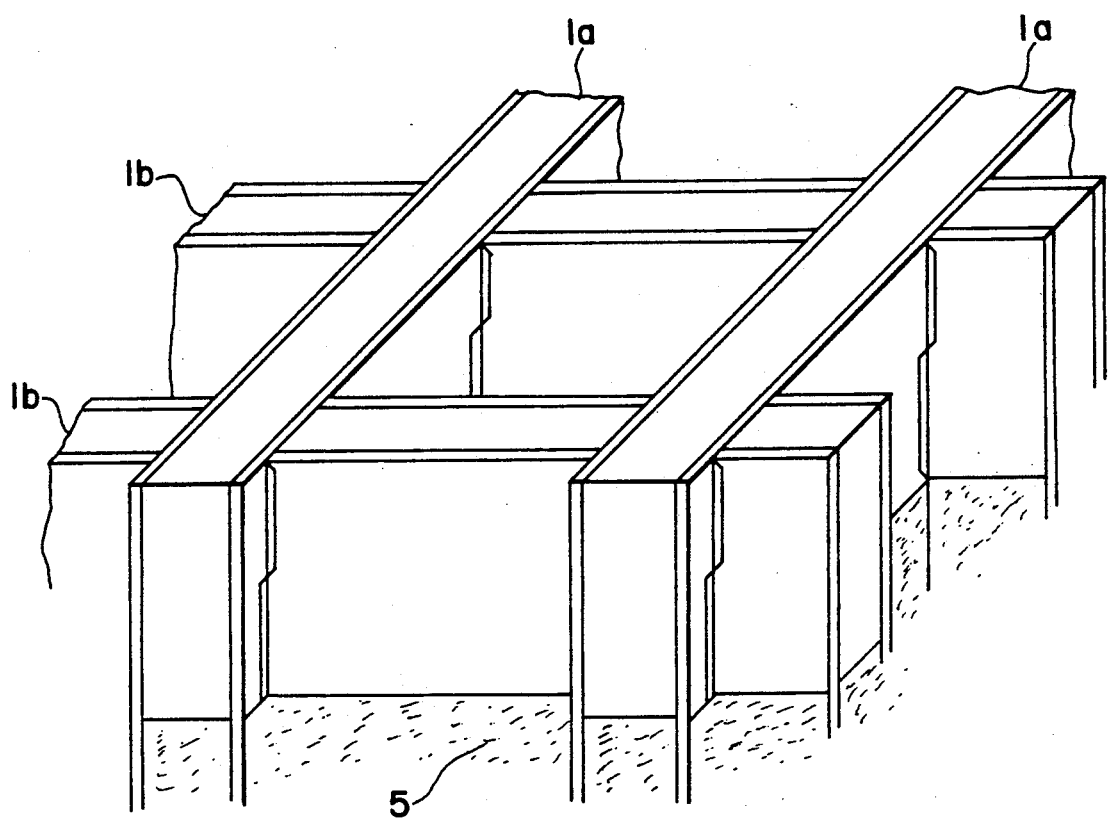
FIG. 7 shows an enlarged view of a portion of the rack of FIG. 6.

FIG. 6 shows a stowage rack according to the invention, comprising an intersecting stack of sections in the form of flat strips. FIG. 7 shows an enlarged view of a portion of the rack of FIG. 6. Strips 1, comprising intersecting, perpendicular strips 1a and 1b with mechanical strength and heat transfer functions, alternate with strips 5 of boron alloy, which absorb neutrons and contribute to the heat transfer. The strips 1 may of course contain openings and/or be replaced by any sections of the same thickness as the strips 5.

The use of standard materials for the invention has the advantage of facilitating construction of the stowage racks, lowering their cost and facilitating their homologation. In racks where the neutrophage rods are metallic and perpendicular to the axis of the cells these rods have the further advantage of improving heat transfer.

What is claimed is:

1. A stowage rack for dry transport of nuclear fuel elements of elongated shape, comprising a plurality of elongated, parallel, adjacent prismatic cells having walls fulfilling the functions of mechanical strength, thermal conductivity and neutron absorption, and formed from first and second sets of materials, said first set of materials being selected from the group consisting of steel, aluminum, copper, magnesium and alloys thereof, said first set of materials provided in the form of elongated sections stacked in successive layers, each said layer lying in a plane perpendicular to the axis of said cells, the sections of a particular layer being equidistant and oriented in the same direction according to the direction of the axis of the cells to form cell walls of predetermined thickness, the sections of two successive layers being oriented in different directions, said second set of materials containing at least one neutron absorber selected from the group consisting of B, Gd, Hf, Cd, In and Li, and said second set of materials provided in the form of elongated sections which are arranged within the thickness of the cell walls, parallel or perpendicular to the axis of the cells, wherein said materials forming said walls are formed of identical bent sections having edges parallel with each other and parallel with the axis of the cells.

2. A stowage rack for dry transport of nuclear fuel elements of elongated shape, comprising a plurality of elongated, parallel, adjacent, prismatic cells having walls fulfilling the functions of mechanical strength, thermal conductivity and neutron absorption, and formed of first and second sets of materials, said first set of materials being selected from the group consisting of steel, aluminum, copper, magnesium and alloys thereof, and said second set of materials containing at least one neutron absorber selected from the group consisting of B, Gd, Hf, Cd, In and Li, said first and second sets of materials being provided in elongated sections of substantially identical shape, which are stacked in a series of layers, each layer lying in a plane perpendicular to the axis of the cells, the sections of a particular layer being equidistant and oriented in the same direction according to the direction of the axis of the cells to form cell walls, the sections of two successive layers being oriented in different directions, said first and second sets of materials forming said walls being formed of identical bent sections having edges parallel with each other and parallel with the axis of the cells.

3. A stowage rack for dry transport of nuclear fuel elements of elongated shape, comprising a plurality of elongated, parallel, adjacent prismatic cells having walls fulfilling the functions of mechanical strength, thermal conductivity and neuron absorption, and formed from first and second sets of materials, said first set of materials being selected from the group consisting of steel, aluminum, copper, magnesium and alloys thereof, said first set of materials provided in the form of elongated sections stacked in successive layers, each said layer lying in a plane perpendicular to the axis of said cells, the sections of a particular layer being equidistant and oriented in the same direction according to the direction of the axis of the cells to form cell walls of predetermined thickness, the sections of two successive layers being oriented in different directions, said second set of materials containing at least one neutron absorber selected from the group consisting of B, Gd, Hf, Cd, In and Li, and said second set of materials provided in the form of elongated sections which are arranged within the thickness of the cell walls, parallel or perpendicular to the axis of the cells, wherein said first set of materials forming said walls is in the form of elongated, extruded flat bars containing tubular receptacle adapted to receive said second set of materials in rod or wire form.

4. The rack of claims 1, 2 or 3, wherein said first and second set of materials forming said walls are rigidly connected together by joining means to maintain the rigidity and cohesion of the stack.

5. The rack of claim 4, wherein said joining means are pins or tie rods.

6. The rack of claims 1, 2 or 3, wherein said first and second sets of materials forming said walls are provided with positioning notches which interact to maintain the cohesion, rigidity and compactness of the stack.

7. The rack of claims 1 or 3, wherein said first set of materials forming said walls is in the form of elements including openings to house said second set of materials in the form of rods or wires, parallel with the axis of the cells.

8. The rack of claims 1 or 3, wherein said second set of materials is in the form of a wire of aluminum-boron master alloy.

9. The rack of claims 1, 2 or 3, wherein at least one section of said second set of materials comprises a plurality of abutted subsections.

10. The rack of claim 2, wherein a layer of materials of said first set is stacked alternately with a layer of substantially identically shaped materials of said second set.

* * * * *